No. 769,593.  
Patented September 6, 1904.

UNITED STATES PATENT OFFICE.

LOUIS DESCAMPS, OF LILLE, FRANCE.

FORMALDEHYDE HYDROSULFITES AND PROCESS OF MAKING SAME.

SPECIFICATION forming part of Letters Patent No. 769,593, dated September 6, 1904.

Application filed September 23, 1903. Serial No. 174,377. (Specimens.)

*To all whom it may concern:*

Be it known that I, LOUIS DESCAMPS, a citizen of the Republic of France, residing in Lille, Nord, France, have invented certain new and useful Improvements in Formaldehyde Hydrosulfites and Processes of Making Same, of which the following is a specification.

This invention relates to a new manufacture of chemical substances resulting from the action of a primary or secondary aldehyde or analogous body or of any body having simple or complex aldehydic function upon hydrosulfites. The said new substances appear to be hydrosulfite aldehydes or analogous bodies. The said bodies are obtained, for example, by causing formaldehyde to act upon an alkaline earthy or metallic hydrosulfite, whether this be in a dissolved condition, in the form of paste, or in the dry state. Such a body may be produced, for instance, from twenty parts of formol at forty per cent. and eighty parts of calcium hydrosulfite at two reducing degrees—that is to say, a hydrosulfite of such strength that two kilograms thereof is required to reduce one kilogram of pure indigotine. The combination produces chemical bodies possessing new properties, and in particular having an extraordinary stability in the dry state and at a high temperature.

In effect, the chemical body resulting, for example, from the above-mentioned action of formaldehyde upon calcium hydrosulfite can be desiccated at a temperature above 100° centigrade and in a current of hot air without being liable to decomposition. The bodies thus produced develop their energetic and rapid reducing and decolorizing properties under the action of moist heat, such as vaporizing with or without pressure. They constitute very good corrosives for the discharge of reducible coloring-matters.

The constitution of the product obtained by this invention has not yet been ascertained with exactness or certainty; but the formula is believed to be the following:

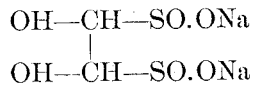

Having now particularly described and ascertained the nature of my said invention and the best means I know of carrying the same into practical effect, I claim—

1. The herein-described method of producing hydrosulfite-formaldehyde compounds which consists in reacting with formaldehyde upon a hydrosulfite, substantially as described.

2. The herein-described method of producing hydrosulfite-formaldehyde compounds which consists in reacting with formaldehyde upon an alkali-metal hydrosulfite, substantially as described.

3. The herein-described hydrosulfite-formaldehyde compound, consisting of a hydrosulfite and formaldehyde in chemical combination, forming colorless crystals, and characterized by the fact that it does not reduce a solution of indigo sulfonic acid at ordinary temperatures, but does reduce such solution at temperatures exceeding 40° centigrade.

In witness whereof I have hereunto signed my name, this 8th day of September, 1903, in the presence of two subscribing witnesses.

LOUIS DESCAMPS.

Witnesses:
 JOSEPH HARDING,
 MALVINA LANDRIEUS.